S. J. TOURTELLOTTE.
STEAMER FOR CULINARY USE.
APPLICATION FILED JULY 27, 1909.

968,715.

Patented Aug. 30, 1910.

Inventor
Sarah Jennie Tourtellotte

Witnesses
H. S. Austin
J. M. Brainerd

By Joshua R. H. Potts
Attorney

UNITED STATES PATENT OFFICE.

SARAH JENNIE TOURTELLOTTE, OF SOUTH HADLEY, MASSACHUSETTS.

STEAMER FOR CULINARY USE.

968,715.  Specification of Letters Patent.  Patented Aug. 30, 1910.

Application filed July 27, 1909. Serial No. 509,793.

*To all whom it may concern:*

Be it known that I, SARAH JENNIE TOURTELLOTTE, a citizen of the United States, residing at South Hadley, county of Hampshire, and State of Massachusetts, have invented certain new and useful Improvements in Steamers for Culinary Use, of which the following is a specification.

My invention relates to utensils for culinary use and particularly to steamers for cooking puddings, brown bread and the like.

The object of my invention is to provide an improved steamer equipped with means in the bottom thereof for lowering the contents preparatory to removing the same and means upon the outside of the bottom for actuating said loosening means.

A further object of my invention is to provide a device as mentioned which shall be of simple construction and of low cost to manufacture.

Other objects will appear hereinafter.

With these objects in view my invention consists generally in a cylindrical member open at the top and provided with a suitable closure, a member rotatably mounted on the inner face of the bottom thereof and means upon the outer face of the bottom for turning said member to loosen the contents from the bottom.

My invention further consists in various details of construction and arrangements of parts all as will be fully described hereinafter and particularly pointed out in the claim.

My invention will be more readily understood by reference to the accompanying drawings forming a part of this specification and in which—

Figure 1:
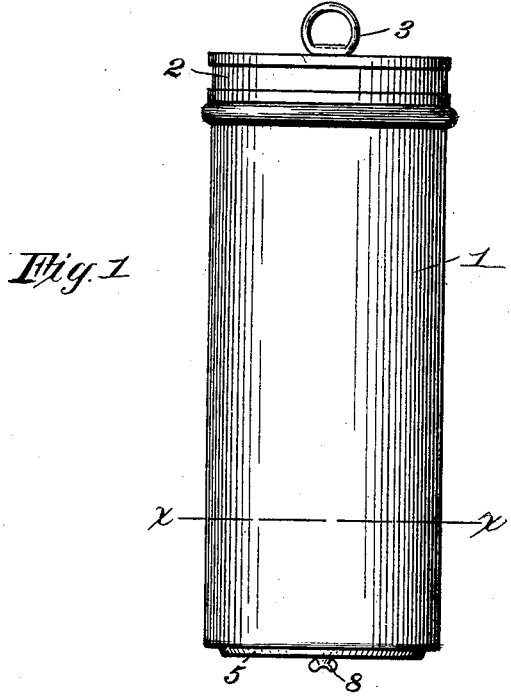
Figure 3:
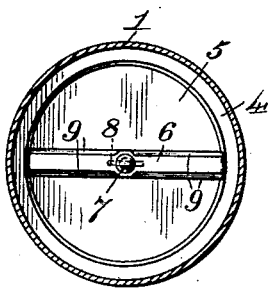
Figure 2:
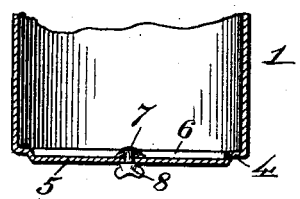

Figure 1 is an elevation of a steamer embodying my invention in its preferred form, Fig. 2 is a detail central vertical section through the lower portion of the steamer, and Fig. 3 is a section on the line x—x of Fig. 1.

Referring now to the drawings, 1 indicates a receptacle or steamer which is preferably cylindrical and open at the top, and 2 indicates a closure for the same provided with a ring or handle 3. The bottom 4 of the receptacle is preferably provided with a slightly depressed circular portion 5 which is almost the full area of the bottom and within which is rotatably mounted a member 6. The member 6 is secured to a centrally disposed stud 7 which extends through the bottom of the receptacle and provided upon its outer end with a thumb piece 8 by means of which the member 6 may be rotated from without said receptacle. The member 6 preferably comprises a two armed knife having both of its lateral edges sharpened as at 9, and it is preferably of a thickness equal to the depth of the depression 5.

Having described my invention, what I claim as new and desire to secure by Letters Patent, is:

In a device of the class described, a receptacle and a bottom for the same, said bottom being provided with a shallow circular depression of slightly less diameter than said bottom forming a narrow raised peripheral portion, in combination with a rotary member arranged within said receptacle upon the depressed portion of said bottom, said member comprising a two armed knife sharpened upon both edges and coextensive in length with the diameter of said depressed portion and of a thickness equal to the depth of said depression, said bottom being centrally perforated, a stud on said member rigidly connected thereto and extending through the perforation in said bottom and a thumb piece rigidly fixed on the outer end of said stud and arranged upon the bottom of said receptacle for actuating said member, substantially as described.

In testimony whereof I have signed my name to this specification in the presence of two subscribing witnesses.

SARAH JENNIE TOURTELLOTTE.

Witnesses:
 MARY A. LONG,
 FRANK E. ANSON.

It is hereby certified that in Letters Patent No. 968,715, granted August 30, 1910, upon the application of Sarah Jennie Tourtellotte, of South Hadley, Massachusetts, for an improvement in "Steamers for Culinary Use," an error appears in the printed specification requiring correction as follows: Line 14, for the word "lowering" read *loosening;* and that the said Letters Patent should be read with this correction therein that the same may conform to the record of the case in the Patent Office.

Signed and sealed this 20th day of February, A. D., 1912.

[SEAL.]
C. C. BILLINGS,
*Acting Commissioner of Patents.*